United States Patent [19]
Daly et al.

[11] Patent Number: 6,002,347
[45] Date of Patent: Dec. 14, 1999

[54] INTEGRATED HAZARD AVOIDANCE SYSTEM

[75] Inventors: Francis W. Daly, Redmond; Daryal Kuntman, Bellevue; Frank Doerenberg, Redmond; James J. McElroy, Bellevue, all of Wash.

[73] Assignee: AlliedSignal Inc., Morristown, N.J.

[21] Appl. No.: 08/847,328

[22] Filed: Apr. 23, 1997

Related U.S. Application Data

[60] Provisional application No. 60/016,277, Apr. 23, 1996, and provisional application No. 60/035,856, Jan. 21, 1997.

[51] Int. Cl.$^6$ .................................................. G08B 23/00
[52] U.S. Cl. .......................... 340/963; 340/945; 340/961; 340/968; 340/970; 701/4; 701/14; 701/301
[58] Field of Search ....................... 340/945, 961, 340/963, 964, 965, 967, 968, 969, 970, 984; 701/301, 4, 14, 120

[56] References Cited

U.S. PATENT DOCUMENTS

| | | | |
|---|---|---|---|
| 3,582,949 | 6/1971 | Forst | 340/945 |
| 3,668,403 | 6/1972 | Mellander | 701/121 |
| 4,121,287 | 10/1978 | Leal | 701/301 |
| 4,646,244 | 2/1987 | Bateman et al. | 701/301 |
| 4,825,438 | 4/1989 | Bennett | 395/185.09 |
| 4,841,448 | 6/1989 | Ford | 701/10 |
| 4,857,922 | 8/1989 | Miller et al. | 340/968 |
| 4,905,000 | 2/1990 | Bateman | 340/968 |
| 4,947,164 | 8/1990 | Bateman | 340/968 |
| 5,111,400 | 5/1992 | Yoder | 701/3 |
| 5,153,588 | 10/1992 | Muller | 340/968 |
| 5,193,175 | 3/1993 | Cutts | 395/182.09 |
| 5,243,339 | 9/1993 | Graham et al. | 340/945 |
| 5,255,367 | 10/1993 | Bruckert | 395/182.09 |
| 5,317,726 | 5/1994 | Horst | 395/182.1 |
| 5,325,517 | 6/1994 | Baker | 395/182.09 |
| 5,384,767 | 1/1995 | Moorwood | 370/408 |
| 5,388,047 | 2/1995 | Ryan | 701/301 |
| 5,388,242 | 2/1995 | Jewett | 711/113 |
| 5,491,787 | 2/1996 | Hashemi | 395/182.09 |
| 5,557,278 | 9/1996 | Piccirillo | 342/29 |
| 5,574,849 | 11/1996 | Sonnier | 395/182.1 |
| 5,588,111 | 12/1996 | Cutts | 395/182.07 |
| 5,638,282 | 6/1997 | Chazelle et al. | 701/301 |
| 5,657,009 | 8/1997 | Gordon | 340/968 |
| 5,710,559 | 1/1998 | Krogmann | 340/963 |
| 5,751,289 | 5/1998 | Myers | 345/419 |

FOREIGN PATENT DOCUMENTS 0 380 460 A2   8/1990   European Pat. Off. ......... G08G 5/04

*Primary Examiner*—Benjamin C. Lee

[57] ABSTRACT

A hazard alert device for aircraft prioritizes various alerts according to predefined criteria. The device enables more optional alerting of hazardous conditions than a system of separate independent and discrete devices.

35 Claims, 7 Drawing Sheets

6,002,347

INTEGRATED HAZARD AVOIDANCE SYSTEM

This application claims priority from and is related to U.S. Provisional Application No. 60/016,277 (Attorney Docket No. 543-96-002) filed Apr. 23, 1996 and U.S. Provisional Application No. 60/035,856 (Attorney Docket No. 543-97-001) filed Jan. 21, 1997, each of which is incorporated by reference.

BACKGROUND OF THE INVENTION

The invention relates to aircraft warning systems and more particularly to warning systems that provide warnings of various types of flight hazards such as wind shear and potential collisions with the ground or other aircraft.

Over the last twenty years a number of sophisticated flight hazard warning systems have been developed for aircraft which have contributed substantially to flight safety. These systems include ground proximity warning systems for providing warnings of controlled flight into terrain type accidents, traffic alert and collision avoidance systems and wind shear detection systems.

However, because in most cases these systems operate independently of each other, it is possible under some circumstances to get warnings from more than one system at about the same time. Further, these warnings can conflict. For example, there are situations in which a ground proximity warning system would generate an aural "Pull Up" warning followed directly by the traffic alert and collision avoidance system generating a "Descend" warning. This type of situation can make it very difficult for the cockpit crew to make a timely determination of the correct response, especially considering the limited time to respond to a given warning.

In one approach to overcoming this problem the flight hazard warning systems generate both an inhibit signal and a warning alert signal. The inhibit signal suppresses alert signals from other warning devices. As an example, a ground proximity warning system can be programmed to generate an inhibit signal which is then transmitted to one or more of the other flight hazard warning systems such as a traffic alert and collision avoidance system.

With the aforementioned approach, every ground proximity warning alert signal will inhibit all traffic alert signals. However, there are situations when it would be advisable to suppress a ground proximity system warning, particularly a Mode 1 warning, in favor of a traffic collision and alert system warning. Similarly, there are some circumstances when a ground proximity Mode 1 warning should take precedence over a predictive windshear warning and other circumstances when the opposite is true. Thus, this approach where one or more flight hazard warning systems is universally programmed to generate inhibit signals for the other systems is overly simplistic and can lead to less than optimal response to a flight hazard on the part of the cockpit crew. Moreover, since there are a very large number of potential flight hazard conditions each with varying criticality and associated probability of an accident occurring, such a simplistic approach is inherently unable to provide optimal warnings of flight hazards.

Another disadvantage of current flight hazard warning systems results from the fact that many aircraft, and in particular commercial aircraft, are equipped with several physically separate systems such as a ground proximity warning system, a traffic alert and collision avoidance system, a reactive windshear system and a predictive windshear system. This federated approach to providing an aircraft with a flight hazard warning system, in addition to the costs of separate hardware, wiring and displays, can make it very difficult to integrate the operations of the systems so as to provide a system where the warnings can be prioritized. In some avionics suites the warning prioritization and interrupts must be implemented using a direct hard wire connection between the systems. Not only is this architecture costly to implement, but this arrangement allows for only a limited prioritization scheme between hazard alerts. In other avionic architectures, the various flight warning systems are connected to a data bus such as the ARINC 429 or 629 buses which transmits the inhibit signals between the systems in lieu of the hardwire connection. This approach still requires that the individual systems each be programmed to transmit the inhibit signals to the specific addresses of the other systems and/or be programmed to receive and to respond to inhibit signals from other systems.

Limited exceptions to the aforementioned architectures are found on some Airbus and Douglas aircraft. On newer generation Airbus and Douglas aircraft, there is no primary reactive windshear detection system. Recovery maneuvers and protection against windshear events are implemented as a part of the flight control system. Prioritization of certain limited hazard alerts such as the windshear alert and altitude call-outs along with other aircraft system failure alerts are performed by a warning unit. However, the major and potentially conflicting alert functions such as GPWS, TCAS, and PrWS are still implemented as federated systems.

SUMMARY OF THE INVENTION

The invention provides an aircraft flight hazard avoidance system where concurrently generated warning signals are prioritized to provide a warning of the most critical flight hazard. As used in this application, the terms "flight hazard", "flight hazard alert" and "hazardous flight condition" pertain to events and conditions external to the aircraft, including, but not limited to, the aircraft flight path, that threaten the continued safety of flight.

According to one aspect of the present invention, the invention additionally provides an aircraft flight hazard avoidance system having a number of individual flight hazard warning systems combined with an alerting system. The alerting system selects one of a concurrently generated alert signals generated by the warning systems for input to a warning indicator where the selected alert signal represents the most critical flight hazard. The flight hazard warning systems can include, for example, a ground proximity warning system, an enhanced ground proximity warning system, a traffic collision warning system, a predictive windshear warning system and a reactive windshear warning system.

According to another aspect of the invention, the invention provides an aircraft flight hazard avoidance system which includes logic for a number of individual flight hazard warning systems where conflicts between concurrent alert signals generated by the warning systems are prioritized based on a hazard integrity factor. The hazard integrity factor is based on the probability that the alert conditions represented by the alert signals will lead to an accident. The hazard integrity factor is based, at least in part, on historical data representing the ratio of alert signals versus accidents for each of the flight hazard warning systems. In resolving the conflict between concurrent alert signals from two of the flight hazard warning systems, the system determines whether the second generated alert signal has a hazard integrity number greater than the first signal and, if so, whether the second is complementary to the first alert signal and, if not, it changes to the alert generated by the second alert signal. Even if the second alert is complementary to the first alert or where the first alert has a greater hazard integrity factor, the system determines if continued pilot response to the first alert will result in a greater hazard integrity factor in which case it will generate an alert in accordance with the second alert signal.

According to yet another aspect of the invention, the invention provides an aircraft flight hazard avoidance system which includes logic for a number of individual flight hazard warning systems implemented in a central computer that also includes logic to resolve conflicts between concurrent alert signals generated by the different warning systems.

According to still another aspect of the present invention, the invention includes a fault tolerant data bus architecture to ensure the integrity and robustness of the alert generation and prioritization logic.

DETAILED DESCRIPTION OF PREFERRED EMBODIMENTS

Figure 1:
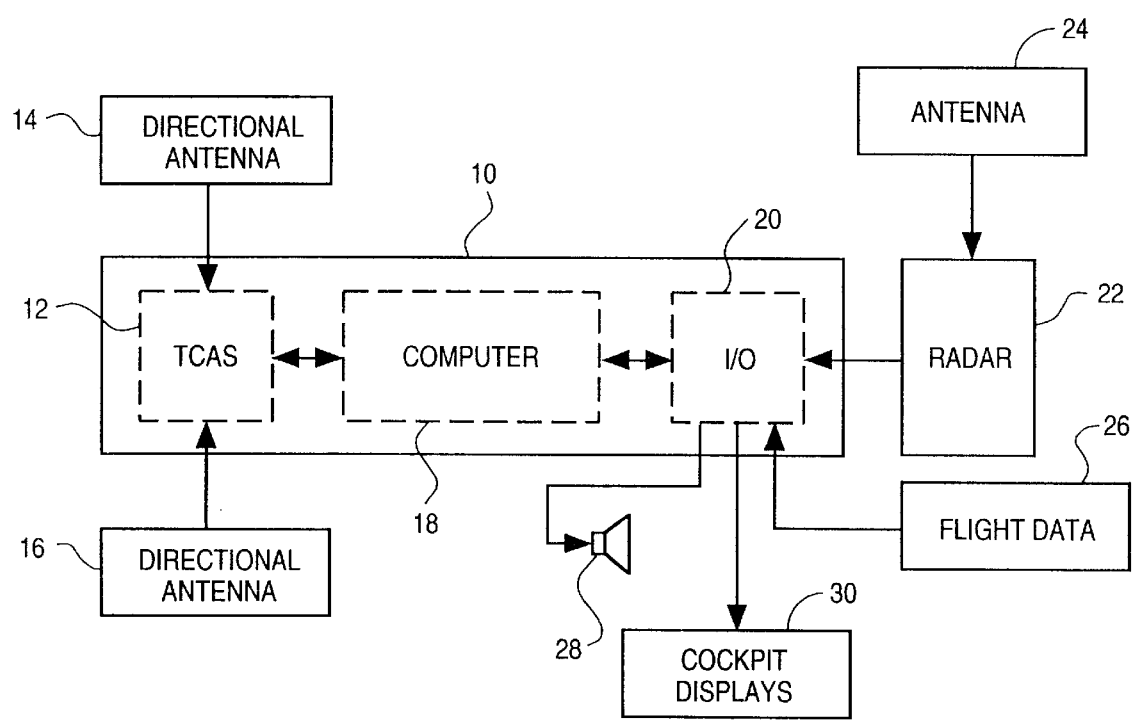
FIG. 1 is a block diagram of an integrated hazard avoidance system according to one embodiment of the invention.

In FIG. 1 is shown in block diagram form the major components of a preferred embodiment of an integrated hazard avoidance system (IHAS) 10. Included in IHAS 10 is a conventional traffic alert and collision avoidance system (TCAS) 12 which is connected to a pair of directional antennas 14 and 16. A central computer 18 is connected to TCAS 10 and to an input/output module 20. Central computer 18, which can include multiple processors for redundancy, among other operations can according to the invention, function as a centralized alerting system performing hazard detecting and alerting functions according to the logic to be described below. Also connected to I/O module 20 is a weather radar 22 and its associated antenna 24. Various types of flight data, for example, barometric altitude, roll and pitch, radio altitude, airspeed, flap and gear position, glideslope and localizer and navigation data (e.g. inertial, gps, conventional) as indicated by a block 26 are input to central computer 18 via the I/O module 20. Indicators in the form of a speaker 28 for generating aural alerts and a set of cockpit displays, that can include a weather radar display for displaying enhanced ground proximity warnings as well as other types of displays, represent by a block 30, are connected to the I/O module.

Central computer 18 can also use conventional programs for generating various alert signals for a number of flight hazard warning systems including: basic ground proximity warnings (GPWS); enhanced ground proximity warnings or terrain alerting (EGPWS); windshear warnings including predictive (PrWS) and reactive (ReWS) and TCAS alerts. Descriptions of suitable GPWS systems are provided in U.S. Pat. Nos. 4,567,483, 5,220,322, 4,433,323, 5,187,478 and 4,684,948, all of which are hereby incorporated by reference. Descriptions of a suitable EGPWS system is provided in U.S. Pat. No. 4,646,244 and in patent application Ser. Nos. 08/509,660 and 08/509,702 which are hereby incorporated by reference. Suitable PrWS and ReWS systems are described in U.S. Pat. Nos. 4,905,000, 5,059,964, 4,725,811, 4,947,164, 5,153,588 and 4,891,642 and are hereby incorporated by reference. Suitable commercially available TCAS systems and associated hardware are described in U.S. Pat. Nos. 5,122,808, 5,272,725, 4,914,733, 5,008,844 and 4,855,748 and in published documents: "Pilot's Guide TCAS II CAS 67A/81A Bendix/King Traffic Alert and Collision Avoidance Systems" and "Pilot's Guide CAS 66A Bendix/King TCAS I Collision Avoidance System" and are hereby all incorporated by reference. Performance specifications on TCAS may be found in TCAS I—Advisory Circular (AC) 20-TCAS draft dated Aug. 15, 1995; TCAS II—Advisory Circular 20-131 dated Mar. 29, 1993; DO 181A RTCA MOPS Mode S Transponder; DO 185 TCAS RTCA MOPS and DO 185A TCAS RTCA MOPS also incorporated by reference.

Since the various flight hazard warnings systems as identified above are well known in the avionics industry, for simplicity they will not be described in detail. To aid in understanding the description of the invention as described herein, the GPWS includes: Mode 1, excessive descent rate; Mode 2 excessive closure with the terrain; Mode 3, descent after take off; Mode 4, insufficient terrain clearance; Mode 5, descent below glideslope and Mode 6, altitude call-outs and excessive bank angle. EGPWS will generally refer to the system having a terrain database that displays threatening terrain on a cockpit navigation or weather radar display.

One possible set of functions for an IHAS 10 include:
a) Weather Radar with Predictive Windshear Detection;
b) EGPWS with GPWS and Reactive Windshear Detection;
c) TCAS;
d) Mode-S Transponder;
e) Flight Data Acquisition Unit and
f) Data Management System.

Other functions and combinations of functions are possible. The IHAS 10 design provides a modular and an open architecture environment that allows other functions and components to be included in system 10. A Flight Warning Computer (FWC) is an example of additional functionality that could be provided in IHAS 10.

The IHAS 10 thus can combine hazard detection and avoidance systems on the aircraft into an integrated unit with significant equipment, installation, and certification cost savings as well as weight and volume reductions contributing to overall lower life-cycle costs. The IHAS 10 provides numerous operational and cost benefits to the user including: weight reduction, size reduction, higher reliability levels, spares reduction, improved safety functionality through effective alert prioritization, and growth potential through modular design.

More specifically, a cost savings is realized in relation to purchasing a suite of equivalent but separate, stand-alone flight hazard warning systems with an associated size reduction of approximately 65 percent and corresponding weight reduction. Installation costs can be reduced in many areas for example, the elimination of the radar waveguide run, less wiring and connectors, elimination of the hardwire between systems and elimination of two ATC antennas and the corresponding switching relay (or four antennas, depending on aircraft configuration).

In addition to lower cost of ownership, IHAS 10 provides several operational benefits that enhance the state of the art in aircraft safety. By centralizing the aural crew alerting functions of TCAS, EGPWS, windshear and other onboard aural warning systems, IHAS 10 can eliminate conflicting and redundant crew messages and provide optimal message prioritization. The IHAS 10 can also permit the optimization of the display of TCAS Radar and EGPWS data in the cockpit for either dedicated or multifunctional displays 30.

As indicated above, current aircraft avionics architectures use federated systems for various hazard related functions in conjunction with a protocol of inhibit signals. The inhibits do not suppress functions, but rather are meant to prevent garbling of aural alerts. Although each system contains different levels of threats, due to hardware limitations, current inhibiting schemes are very simplistic with very little attention given to human factors issues. In some cases the inhibited alert might be the most appropriate alert, if the total hazard situation and pilot response are considered.

Furthermore, in the multiple alert scenario, it is also possible to have conflicting alerts being issued by different systems consecutively; such as, for example, a "Descent" alert from TCAS followed by a "Pull Up" from the GPWS. The main conflict is typically between TCAS descent related alerts and GPWS (Modes 1 and 2), PrWS and ReWS alerts. Since TCAS RA alerts are inhibited below 900 ft descending (1100 ft climbing), GPWS modes 3 through 5 are less effected. The TCAS has numerous descent related alerts which may conflict with ground proximity warning alerts:

a) Descent, preventative ("Monitor Vertical Speed");
b) Descent, corrective ("Descend, Descend, Descend");
c) Crossover descent, preventative ("Monitor Vertical Speed");
d) Crossover descent, corrective ("Descend, Crossing Descend, Descend, Crossing Descend");
e) Change from climb to descend ("Descend, Descend NOW"); and
f) Increase descend rate ("Increase Descent, Increase Descent")
   Another example of conflicting alerts is the potential conflict between windshear detection systems; the reactive windshear which is part of the GPWS and predictive windshear which is part of the radar system 22. There is a significant difference in warning times between these systems: 10 seconds minimum for the predictive system and minus 5 seconds for the reactive. As a result, there can be different expected pilot reactions to these warnings. Pilots execute a windshear recovery maneuver for the reactive warning and execute a go-around for the predictive warning. If the flight crew misinterprets the reactive alert as a predictive, chances of successful recovery of the aircraft can be jeopardized.

The probability of a multiple hazard alert condition is not insignificant. For example, the probability of a TCAS Resolution Advisory (RA) is approximately one in 120 flight hours and the probability of a TCAS Traffic Alert (TA) is one in 25 hours. Assuming an average time of 0.1 hours for the landing/takeoff phase of each flight, the probability of a TCAS RA occurring at the same time other hazard detection systems are enabled is one in 1200 flights. The probability of a GPWS alert is on the same order of magnitude: one in 1000 flights. Taking into account other hazard detection systems, the probability of a TCAS RA alert occurring contemporaneously with another alert becomes on the order of one in $10^5$ flights. The probability of a multiple alert is therefore even greater with TCAS TAs. These figures substantiate the need to provide the flight crew with the capability to cope with multiple alerts.

The IHAS 10 may resolve the issue of multiple alerts using any one of several prioritization schemes as is to be described in detail below. The prioritization scheme can be implemented by a central device, for example, by computer 18 thereby overcoming the limitations of the federated systems. The IHAS 10 outputs appropriate alerts based on this prioritization scheme while suppressing conflicting and potentially misleading alerts. The resultant prioritized alerting scheme can substantially improve safety, especially in the presence of multiple hazards.

The following hazard related functions are exemplary of the types of functions for which IHAS 10 can implement an alert prioritization scheme as well as define preferred interactions: GPWS; Modes 1 through 5; Altitude Call-outs; Bank Angle Alerting; Reactive Windshear; Predictive Windshear; Terrain Alerting (EGPWS); and Traffic Alert and Collision Avoidance System (TCAS). Additional hazard functions may be added as developed and/or appropriate.

One possible prioritization scheme for IHAS 10 reflects the generalized order of priorities currently accepted by the FAA. In order from highest to lowest, the priorities between functions are:

ReWS
PrWS
GPWS
TCAS

Implementing this prioritization scheme using IHAS 10 has several advantages and additional capabilities over the federated systems of the prior art. For example, the PrWS requirements document, requires that GPWS Modes 2 through 4 be available following the PrWS alert. Due to physical limitations of the federated systems, however, such detailed level of prioritization is not feasible. In addition, all alerts are treated identically. Thus, for alert prioritization purposes, the PrWS Caution and Warning level alerts are treated as the same, although there is significant difference between criticality of these alerts. A typical IHAS alert schedule that implements the FAA approved prioritization is described in the following paragraphs.

The ReWS has the highest level of prioritization. The "Windshear, Windshear, Windshear" aural alert overrides any other aural alert.

The PrWS alert signal is second in priority and can only be superseded by ReWS. In the unlikely event case that PrWS is generated while the ReWS is active, the PrWS alert signal is delayed until ReWS aural alert ("Windshear, Windshear, Windshear") is completed. If the PrWS alert starts first, it is inhibited as soon as the ReWS starts. The PrWS can inhibit the GPWS (all modes) and TCAS, but only when the aural output from the Weather Radar is active. Once the aural alert message is completed, the GPWS and TCAS can generate their aural alerts. The GPWS, however, can inhibit PrWS, if the GPWS starts before the PrWS alert, although the PrWS has higher priority. This alert scheme may lead to conflicting alerts; such as, "Windshear Ahead" annunciation from PrWS followed by a "Descend" alert from the TCAS, again causing distraction and confusion which can reduce safety margins.

3. The GPWS alert is next in priority and inhibits TCAS alert signal, while the aural output is active regardless of the mode. Once the aural alert is finished, the TCAS alert is allowed. This alert schedule can result in "Terrain Terrain" alert followed by "Descend" from TCAS to be followed by "Pull up" from GPWS again.

4. The TCAS has the lowest priority. The TCAS alert does not override any other alert.

IHAS Alerting Criteria:

Implementing the above schedule using IHAS 10 overcomes the need to wire the prioritization into the hardware. However, with the alerting system of IHAS 10, more sophisticated alerting schedules are possible which not only address the disadvantages identified above but add additional capabilities to the alerting system. In particular, the alerts can be based on evaluation of the total hazard situation. The following is a list of general alerting criteria which can be applied to IHAS 10 to improve overall safety:

1. Alerts are prioritized based on criticality of individual hazards; in the case of GPWS, individual modes. Hazard criticality is based on alert time and the probability of the hazard resulting in an accident.

2. In the case of multiple threats, alerts which can not contribute to enhancement of pilot's situation awareness, but can result in confusion, are suppressed.

3. If the pilot is responding to an alert, suppress other warnings with the same expected pilot reaction. As an example; if the pilot is responding to a climb command from the TCAS, "Pull up" warning from the GPWS Mode 1 is suppressed.

4. Threat conditions can be evaluated based on expected pilot reaction to an alert. As an example, if a "Descend" warning from TCAS would result in putting the aircraft in a potential CFIT condition, the appropriate alert is generated based on reducing the total probability of an incident.

5. The format of the alerts can be chosen to facilitate easy interpretation while minimizing misunderstanding and misinterpretation; although in this description, the alerts are not changed from their current definitions.

Alert times for various hazard detection functions are summarized in Table 1. Table 2 contains a comparison of alert times as a function of altitude. The information of Tables 1 and 2 can be used in prioritization of the alerts. The alert schedule varies with respect to the aircraft's altitude above ground level (AGL) and, as such, are set forth below in terms of altitude bands.

Alert Prioritization and Interactions:

Prioritization and interaction of different alerts for these altitude bands are shown in Table 3 below. In Table 3, the term "Priority" means that if multiple alerts are present at the same time, the one with higher priority is issued. Once the aural alert for the higher priority alert is finished, the lower priority alert can be generated. The term "Suppress" means that the alert is inhibited as long as the higher priority alert condition exists. If the pilot does not execute the proper maneuvers for the active alert, the suppression would be removed, and the lower priority alert is issued.

These assignment of priorities and interactions shown in Table 3 represents the preferred operation of the IHAS 10. However, it should be understood that further investigation of human factors issues might result in alterations to the above alerting scheme. In Table 3, changes from current implementations of general warning criteria are shown as shaded blocks. A discussion of these changes follows.

Above 2450 ft:

The only active system is TCAS. No priority assignment is required other than internal TCAS priorities.

1500–2500 ft AGL:

Between these altitudes windshear alerts are disabled. The only active GPWS modes at these altitudes are modes 1 and 2. Prioritization issues involve GPWS (Modes 1 and 2), EGPWS Terrain Alerts, and TCAS.

Mode 1 Caution ("Sink Rate"):

At these altitudes, the alert time for Mode 1 Caution is in the order of 25–30 seconds, assuming flat terrain. In contrast, the alert time for TCAS RAs is in the order of 15 seconds or less. Also, the TCAS commands are based on the assumption that, if properly executed, the aircraft altitude would not change more than 500 ft. Based on these considerations, TCAS RA has higher criticality level than the Mode 1. For RAs associated with descend commands, the TCAS alerts are assigned higher priority, but Mode 1 Caution is allowed immediately following the TCAS alert to provide enhanced situation awareness for the flight crews. For TCAS RAs associated with climb commands, Mode 1 should be suppressed; since, if the pilot follows the TCAS command, the excessive sink rate condition would be corrected.

Mode 1 Warning ("Pull Up"):

Based on the alert times, approximately 20 seconds for Mode 1 and 15 seconds for TCAS, in general, TCAS should have priority. Alerts associated with descend and climb related commands are treated differently. If the pilot follows the descend related TCAS commands, the excessive sink rate hazard would increase. Based on this consideration, descend related RAs are suppressed. In contrast, climb related RAs are given priority over Mode 1.

Mode 2 Caution/Warning ("Terrain" and "Pull Up"):

Since there is a very small difference between alert times for Mode 2 Caution and Warning, these alerts are considered together. The nominal alert time for Mode 2 is in the order of 17 seconds. However this figure is valid only for terrain with uniform slope. In reality, the alert times can be considerably shorter. In addition, in some instances, immediate and extreme corrective action might be required to avoid an incident. Based on these considerations, Mode 2 is assigned the highest priority. All TCAS warnings are suppressed; although, TAs might be allowed.

EGPWS Caution ("Terrain Ahead"):

The alert time for EGPWS Caution is in the order of 50 seconds. This time is considerably longer than TCAS alert times. As a result, the EGPWS is considered the lowest priority alert. However, EGPWS alerts are not suppressed so as to enhance pilot's situation awareness while executing TCAS commands.

EGPWS Warning ("pull Up"):

The alert time for EGPWS Warning is in the order of 20 seconds; therefore, it is not assigned the same level of priority as the Mode 2. For RAs associated with climb commands, RAs are given priority due to much shorter alert time for the RAs. The descend related RAs are suppressed; since if the pilot follows such commands, it would increase the terrain hazard.

1000–1500 ft AGL:

In addition to the functions listed above, at 1500 ft AGL alerts from both reactive and predictive windshear (Level I at 1500 ft., Level II and III at 1200 ft.) detection systems are enabled. Still the only active GPWS modes are 1 and 2. At these altitudes alert times for GPWS Modes 1 and 2 are not significantly different from the altitude band of 1500–2450 ft.; therefore, priorities and interaction of TCAS, EGPWS, and GPWS Modes 1 and 2 are the same as listed above.

Prioritization issues involve ReWS, PrWS, GPWS (Modes 1 and 2), EGPWS Terrain Alerts, and TCAS. The TCAS RAs (Warnings) are disabled at 900 ft descending and 1100 ft climbing. For simplicity, the boundary is assumed to be at 1000 ft for both cases. Additionally, TCAS "Descend" RAs are inhibited below 1100 ft AGL (1000 ft descending and 1200 ft climbing), and "Increase" Descend RAs below 1450 ft. The following are highlights of interaction and priorities between TCAS and windshear alerts, as well as windshear alerts and EGPWS/GPWS Modes 1 and 2.

ReWS ("Windshear"):

The ReWS has the shortest alert time of any hazard detection system specifically identified herein. As a result, ReWS has the highest priority over any other alert. Because of this factor and the consideration that the windshear escape maneuver is an emergency maneuver, all TCAS and GPWS/EGPWS alerts are suppressed as long as the windshear hazard is present and the pilot is executing the windshear escape maneuver.

PrWS Advisory (Icon only, no aural alert):

The alert time for PrWS is in the order of 60–90 seconds, making it one of the longest alert times being considered in this document. As a result, the PrWS icon alert has the lowest priority. Considering the short alert time of Mode 2, PrWS is suppressed to prevent cockpit distraction. All TCAS alerts have priority over the PrWS Advisory. As far as the GPWS Mode 1 alerts are concerned, there is no aural alert conflict with PrWS Advisory, and both are allowed. With respect to EGPWS, there is a potential conflict of display availability between predictive windshear and terrain data since only one can be displayed at a time. This problem can be eliminated with IHAS 10, which can combine displays for both alerts.

PrWS Caution (Chime):

The alert time for PrWS Caution is on the order of 30–70 seconds, considerably longer than TCAS RAs. Therefore, TCAS alerts have higher priority. The same consideration is also valid for GPWS Modes 1 and 2 warnings. In the GPWS case, PrWS is inhibited, since corrective actions in response to the GPWS warnings might increase the aircraft altitude making the windshear non-hazardous. In comparison to EGPWS Caution, PrWS Caution has the shorter alert time and higher priority. The opposite is true for GPWS Mode 1 Caution.

PrWS Warning ("Go Around, Windshear Ahead"):

PrWS Warning might have the shortest alert time other than GPWS Mode 2. As a result it has priority over GPWS Mode 1, and EGPWS. This alert also suppresses TCAS alerts and GPWS Mode 1 Caution to reduce distraction at the critical phase of avoiding windshear hazard.

500–1000 ft AGL:

At these altitudes there are no RA nor aural alerts from TCAS. Threat aircraft still appears on the traffic display at the caution level. Three additional GPWS modes are enabled, Mode 5 (landing), Mode 3 (take off), and Mode 4 (terrain clearance). The high speed modulation of Mode 4 is not considered at this time.

ReWS ("Windshear"):

Interaction of ReWS is the same as analyzed above. It has the highest priority and suppresses every other alert.

PrWS Advisory (Icon only, no aural alert):

Since there is no aural alert conflict issue, PrWS is allowed in the case of all other alerts. The only exception is GPWS Mode 2 which suppresses PrWS Advisories or the reasons stated before.

PrWS Caution (Chime):

Interaction and priorities between PrWS Caution and EGPWS and GPWS modes 1 and 2 are the same as stated before. In the cases of Mode 3 and Mode 5 Hard alerts, the GPWS has the priority. PrWS has priority over Mode 5 Soft alert. These priorities are assigned on the basis of alert times.

PrWS Warning ("Go Around, Windshear Ahead"):

PrWS Warning might have the shortest alert time other than GPWS Mode 2. As a result it has priority over GPWS Mode 1, and EGPWS. It also suppresses TCAS alerts and GPWS Mode 3, Mode 5 and Mode 1 Caution to reduce distraction. 50–500 ft AGL:

At these altitudes there are no RA nor aural alerts from TCAS. The active alerts at these altitudes are the same as from the 500–1000 ft AGL band, however, one additional GPWS mode is enabled: Terrain Clearance Floor (EGPWS). In addition, the relative criticality of the hazards changes due to proximity with the ground.

ReWS ("Windshear"):

Interaction of ReWS is the same as previously analyzed. It has the highest priority and suppresses every other alert.

PrWS Advisory (Icon only, no aural alert):

Since there is no aural alert conflict issue, PrWS is allowed in the case of all other alerts. The only exceptions are GPWS Modes 1 and 2 which suppress PrWS Advisories for the reasons stated before.

PrWS Caution (Chime):

Interaction and priorities between PrWS Caution and EGPWS and GPWS are the same as stated before. In the cases of EGPWS Terrain Clearance Floor, it also has priority over PrWS Caution.

PrWS Warning ("Go Around, Windshear Ahead"):

Interaction and priorities between PrWS Warning and EGPWS and GPWS Modes 1, 2, and 5 (Soft) are the same as the 500–1000 ft altitude band. For Modes 3, 4, and 5 (Hard) PrWS has the priority. None of these modes are suppressed due to close proximity to the ground and shorter alert times for these modes, resulting in higher criticality levels. Also, the pilot might attempt to land in front of an windshear event, making these other hazard detection modes very important.

Other Alerting Considerations:

Integration capabilities of the IHAS 10 can also be exploited to improve hazard avoidance process and enhance situation awareness by changing the characteristics of the alert. The previous analysis has been based on similar or identical alerts formats to the current hazard alerts implemented in federated systems.

An example of such improvement is combination of IVSI, TCAS RAs, and GPWS Mode 1 alert limits. By showing the Mode 1 alert limits, both caution and warning, on the IVSI tape, pilots' situation awareness with respect to sink rate can be improved. Such a display can function as an advisory alert for Mode 1. With this combined display capability, in the case of multiple alerts, TCAS RA and Mode 1, the total situation can be presented to the flight crews in on the cockpit display 30 with easy interpretation of expected reactions.

Another example of an advisory type of displays is combination of the Altitude tape with GPWS Modes 3 and 4 alert limits. Such displays would supplement the minimum descent altitude (MDA) indication, again enhancing total situation awareness of the flight crews. Similar implementation can also be used with the glide/slope deviation indicator showing Mode 5 limits.

In one embodiment of the invention the computer 18 in IHAS 10 can be programmed to implement the warning criteria as set forth in Table 3.

Figure 2:
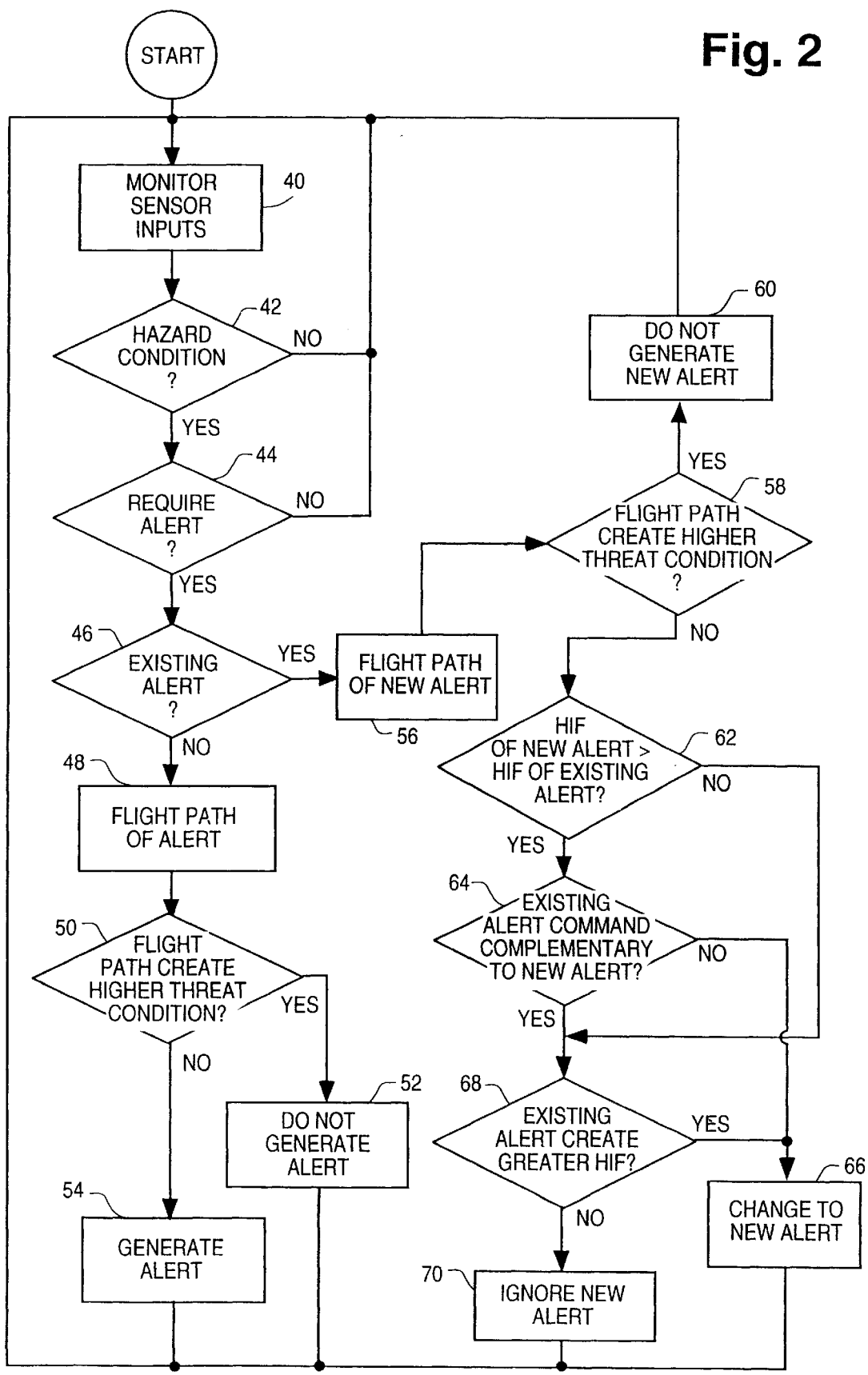
FIG. 2 is a logic flow chart illustrating a system for prioritizing flight hazard alerts according to one embodiment of the present invention.

Another embodiment of the alerting system, utilizing IHAS 10 of FIG. 1, is illustrated in the logic flowchart of FIG. 2. In this embodiment, a Hazard Integrity Factor (HIF) can be used in the determination of which alert should be generated by IHAS 10, in situations where there are multiple contradictory alert conditions. The purpose of the HIF is to determine which alert condition represents the highest probability of an accident. This information can be obtained from historical data of alert rates and accident rates. For example, TCAS alerts using 1994 data are in the order of approximately 10,000 alerts per one million flights. But, the probability of a mid-air collision for an air transport type aircraft is only approximately one in five years using the 1990–1994 fatal accident data. During that five year period the total number of flights is approximately 70 million. Thus, the TCAS accident to alert rate is one accident per 700,000 alerts. As a result, the HIF, which represents the probability of an accident following an alert, is one over 700,000 or 1.4 in one million. In contrast, based on the data for the same years, the alert rate for the GPWS is 1,900 per one million flights and the accident rate is 17 over five years. This results in one accident per 7,800 alerts or an HIF of 128 in one million. Based on these HIFs, it appears that the probability of an accident occurring after a GPWS alert is significantly greater than the probability of an accident after a TCAS alert. Therefore, for example, the HIF criteria suggests that in most cases the GPWS alert should be issued when there is a conflict with a TCAS alert.

The flowchart of FIG. 2 illustrates how the HIF criteria can be used by computer 18 in combination with information of the type provided in Tables 1–3 to implement the alerting system so as to provide optimum hazard warnings. As indicated by a box 40, computer 18 monitors input from various sensors received from the flight data bus 26, TCAS system 12 and radar 22. When a flight hazard condition is detected by computer 18, as indicated by a decision box 42, a decision is made, as indicated by a decision box 44, as to whether a warning alert should be generated. If an alert is required, a determination is made as to whether there is an existing alert being generated as indicated by a decision box 46. If there is no existing alert, computer 18 will determine the flight path indicated by the alert, as shown by a box 48. Then, as indicated by a decision box 50, if the projected flight path suggested by the alert does create a greater flight threat condition, an aural or visual alert is not generated as indicated by a box 52. On the other hand, if the projected flight path does not create a greater flight threat, the computer 18 will generate an aural or visual alert, or both, on the speaker 28 or cockpit display 30 as indicated by a box 54.

Returning to the decision point 46, if there is an existing alert, the flight path of the new alert is determined, as indicated by a box 56. After the flight path of the new alert has been calculated at 56, if a determination is made, shown by a decision box 58, that the new flight path would create a greater threat condition, the new alert is not generated or suppressed, as indicated by a box 60. Otherwise, as shown at a decision box 62, a determination is made as to whether or not the new alert has a greater HIF than the existing alert. In the event that the new alert has a greater HIF than the existing alert, computer 18 then determines, as indicated at a decision box 64, whether or not the aural or visual alert command to the pilot generated by the new alert is complementary to the command generated by the existing alert. By complementary, it is meant that the alteration in flight path suggested by the alert command is in the same general direction. For example, a "pull up, pull up" aural alert from the GPWS would not be complementary to a TCAS "descend, descend" aural alert. If the new alert command is not complementary, computer 18 will generate the new alert as shown at a box 66.

In the case that the determination at 64 indicates that the new alert command is complementary to the existing alert command, a further decision is made, as shown by a decision box 68, as to whether or not the existing alert command would create a greater HIF condition than the new alert command. If the existing alert command would lead to a greater HIF condition, then the new alert is not generated, as shown at a box 70; otherwise, computer 18 generates the new alert at 66.

One of the advantages of the method illustrated in FIG. 2 is that, in addition to the criteria generally shown in Tables 1–3, IHAS 10 can take into account the relative HIFs of various types of flight hazard alerts along with the consideration of the nature of alert commands in determining the priority of alerts.

It should be noted that, although the embodiments of the invention as described above have used computer 18 to generate the various alert signals along with implementing the alerting system function, it would be possible to use separate or federated systems to generate alert signals for input into the alerting system.

The IHAS 10 as described above overcomes a number of disadvantages of the current federated architecture for flight hazard detection systems where alerts are optimized for individual systems. Usually the impact of multiple alerts conditions is neglected in such systems. In most cases, the integration of multiple systems consists of providing inhibit signals between the systems to prevent garbled aural alerts. The IHAS 10 eliminates conflicting alerts from being issued by different systems consecutively; such as a "Pull Up" from the GPWS followed by a "Descend" alert from TCAS. These situations can lead to confusion in the cockpit which can result in delayed or inappropriate crew responses, reducing safety margins. With IHAS 10, as described above, conflicting and confusing alerts can be avoided while improving total situation awareness of the flight crews. An analysis of the alert times for TCAS, GPWS, and windshear detection system alert times and criticalities shows that in the case of multiple hazard threats, the present federated systems with currently defined priorities do not issue the optimum alerts. In addition, the IHAS 10 can result a substantial reduction in hardware and installation costs over federated systems.
Hardware Implementation of IHAS Preferably, IHAS 10, including TCAS 12, central computer 18 and input/output module 20, would be contained in a single housing. For example, the housing can be based on industry standard Integrated Modular Avionics (IMA) concepts using either ARINC 600 or ARINC 650 IMA packaging. Two 6 MCU boxes (for a total of 12 MCUs) could be used for ARINC 600 packaging as compared, for example, to a total of 32 MCUs used in an Allied signal Inc. system which is installed in an aircraft as separate flight hazard warning systems. Alternatively, one cabinet with modules occupying approximately 24 Avionics Module Units (AMUs) could be used for ARINC 650 packaging.

The IHAS 10 can host applications of any criticality level from non-essential to flight critical. Further, IHAS 10 architecture allows new applications to be added through software changes, without requiring additional hardware. This is achieved by employing powerful central processors for computer 18 along with common power and I/O interfaces 20. Optimally, additional functionality can be provided by connecting modular cards containing such functionality and/or processing capability along a common backplane. To increase the reliability of IHAS 10, each module of IHAS 10 can be connected using a fault tolerant bus of the type disclosed in U.S. Provisional Patent Application Ser. No. 60/035,856 incorporated by reference and described below.

As described IHAS integrated system 10 offers growth potential and solutions as compared to the technical problems associated with the installation of stand-alone safety systems on an aircraft. The IHAS 10 design philosophy is consistent with the guidelines of the ARINC Report 651, Design Guidance for Integrated Modular Avionics (IMA), and is not merely a collection of individual functions packaged in a single unit. Instead, IHAS 10 is a complete system design with generic hardware processing modules, such as I/O module 20, processor units 18, and a power supply (not shown). The functions to be performed are determined by the software loaded into the system. A current exception to this philosophy is the TCAS/Mode-S RF module associated with TCAS 12, and the Radar RF module 22. The reason for these exceptions is that the highly specialized function of these components presently makes it less advantageous to use generalized software. However, these functions could be integrated with other software modules if desired. Optionally, functions may comprise line replaceable units or firmware in the form of cards or other preprogrammed devices.

The IHAS design provides an open architecture environment that allows functions and components to be developed by the aircraft manufacturer, airline or other vendors. By centralizing the crew alerting functions of the hazard warning systems included in IHAS 10, IHAS can eliminate conflicting and redundant crew messages and provide optimal message prioritization. In a preferred embodiment, the present invention, permits the exchange of data from each of the modules of IHAS 10 in a manner that ensures data integrity as well as in a fault tolerant manner. The IHAS data bus architecture thus permits an integrated hazard warning device for aviation to operate with robustness and integrity of data processing and with the obvious safety benefits thereof False or inaccurate warnings are thereby reduced or eliminated and the likelihood that a warning will fail to be given is also reduced or eliminated.

According to one embodiment of the present invention, a PC-type bus or other bus known to those of skill in the art may be used in IHAS 10. Robustness and fault tolerance may be provided by using redundant data lines in the bus. Failures will not be fatal since the same signal is carried on a second bus line. In the event of corrupted data, error checksums for data transmitted simultaneously over two or more bus lines can be used to detect such errors. Optimally, other bus systems known to those of skill in the art may be used for IHAS 10.

In one embodiment, however, a fault tolerant design is used. The hardwire and bus architecture described herein provides for a bus protocol such that data collisions are avoided. Furthermore, as discussed in detail below, the design also provides for application specific levels of robustness and fault tolerance depending upon user preference or the safety criticality of the associated application.

Figure 3:
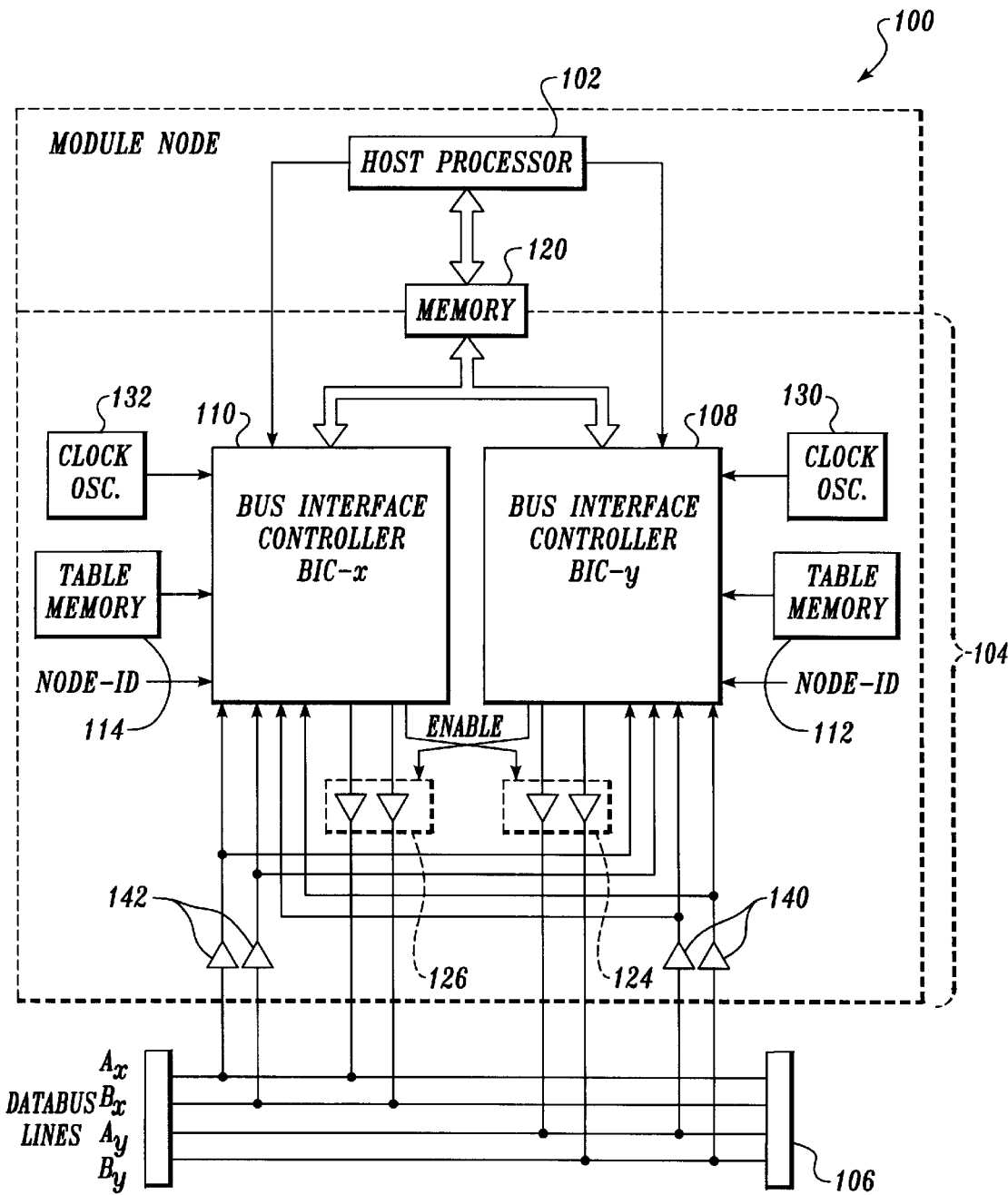
FIG. 3 is a block diagram of a fault tolerant data bus architecture for implementing a hazard avoidance system according to one embodiment of the present invention.

As stated above, IHAS 10 may include multiple hazard alerting functions in the form of separate modules which may be included in IHAS 10 as a plurality of line replaceable units (LRUs), or as firmware or cards, or implemented in computer 18 as software modules. The backplane data bus is a high-integrity time-multiplexed data bus for the purpose of transferring digital data between nodes or modules within the same system enclosure and is illustrated in FIG. 3. Each processing node 100 comprises of a processing entity 102 that may host multiple application functions, possibly dedicated input/output (if the node is an I/O module), and a backplane bus interface 104. The latter is connected to the actual bus signal lines 106. In the preferred embodiment, there is no centralized control of the bus.

Bus 106 comprises four transmission lines in a dual-dual configuration. Each node contains two bus interface controllers (BICs) 108,110. BICs 108 and 110 manage all data transfers between the actual bus and a host's memory 120, format data-to-be-transmitted into messages, and transmit messages onto the bus during uniquely designated time-slots. BICs 108,110 independently determine if such a time-slot is coming up, and cross-enable each other's bus line drivers 124,126 accordingly. In addition, BICs 108 and 110 perform decoding, cross-checking and fault detection on received data. Each BIC-pair also synchronizes to BIC-pairs in other nodes. Each BIC 108,110 has its own independent clock oscillator 130,132 to prevent failure of a single oscillator from causing the associated node from transmitting during an other node's time-slots, and thereby causing total failure of the bus for all nodes.

Each BIC 108, 110 further includes table memory 112, 114. Memories 112 and 114 contain information regarding the unique allocation of transmission time-slots to various nodes, and the boundaries of the associated areas in host's memory 120 where the local BICs are allowed to read data-to-be transmitted, or write received and validated data. The latter "write" is done, based on the destination address that is transmitted as part of the message.

Each BIC 108,110 has one physically and electrically independent pair of bus line drivers 124,126. The drivers of one BIC are enabled by the other BIC of the same BIC-pair. The drivers are of a type that allows multiple drivers to be active simultaneously (either for the purpose of synchronizing, or due to a fault) without causing damage to any of the drivers. The BICs share four bus line receivers 140,142.

According to one embodiment of the invention, each BIC has a port for the purpose of uniquely identifying the node within the system enclosure, as well as the position of that enclosure (e.g., "left" vs. "right" cabinet or LRU). The ports are strapped separately for each BIC.

In operation, data is transmitted serially, onto duplicate paths by each BIC 108,110, e.g. simultaneously onto four bus lines. The nominal data rate is 16 Mbs, but other rates are possible. BICs 108,110 use a sampling scheme to clock-in data streams from the bus. The data bits on one bus line from each BIC are inverted; this signal encoding, combined with an Error Detection Code checksum in each message and pair-wise comparison of the four message copies, enables effective verification of the integrity of each transmission by all receiving BICs.

Transmission activity is organized into fixed-length cyclic frames. Each such frame comprises the same, fixed number of time-slots. In one embodiment, a frame comprises 2048 consecutive time slots, each having the same length. A time-slot either contains a single fixed-format message and an inter-message gap time, or is empty.

The first time-slot of each frame is dedicated to synchronization between the nodes. Multiple nodes may transmit simultaneously during this time-slot. Each of the remaining time-slots in the frame is either dedicated to one particular transmitting node, or is not assigned at all. This assignment is programmed into the table-memory of each BIC; hence, nodal access to the bus for transmission is fully deterministic. Nodes whose BICs are in sync with the backplane, always transmit during assigned time-slots. They either transmit an idle message or an actual data message. Both messages have the same basic format.

One or more channels (groups of time-slots) are dedicated exclusively to each application that needs to transmit on the backplane bus 106. Before transmission can take place, the application places its data at consecutive locations in the memory partition that is allocated to this application for data transmission on the particular channel. During each time-slot, the BICs in each node check their table memory and determine if the upcoming time-slot belongs to a group of slots that are dedicated to the local node for transmission. If so, the BICs fetch data from the memory partition of the application function that is associated with the particular time-slot. The memory partition limits are stored in the BICs' table memory; the actual address within the partition is found in a BIC register that is dedicated to transmission related bookkeeping, and is initialized by the sending application. The same register contains the destination address for the particular data item. The fetched data and destination address are formatted into a message. The latter is serialized onto the four bus lines by the node's BIC-pair during the next time-slot.

All BICs in all nodes receive all transmitted messages. Each BIC buffers the message bit-streams from the four data lines. The correctness of each copy of the message is determined by evaluating the error detection checksum that is part of the message, and by pair-wise comparisons of the four copies. If two or more of the copies are valid and identical, one of them is written to the destination address contained in the message. This address is referenced to the memory partition of the destination application in the receiving node. The memory partition limits associated with the particular time-slot are stored in the BIC's table memory.

The fault-tolerance scheme at the IHAs system level may require the migration of an application function from one processing node to an other. This requires the associated data transmissions to migrate as well. The assignment of channels to nodes is predetermined, and captured in the time-tables memories. There is only one mapping of time-slots to channels and nodes, thus, there is no dynamic reconfiguration of the time-table, and channels do not migrate with application functions. To enable system reconfiguration, one or more "back-up" channels are dedicated to the node in which a migrating application function may be activated.

To ensure time partitioning on the backplane bus 106, all BIC-pairs 108,110 are synchronized. The synchronization scheme is "distributed". In other words, there is no central clock or similar single-point of failure. Synchronization between nodes is done at the beginning of each frame. The BICs in each node independently determine that it is time to transmit a sync message. The sync message is basically a data message with a unique bit pattern that looks like a sync pulse. Due to the nature of the bus (DC-coupled with passive pull-up), the simultaneously transmitted sync pulses can be "wire-OR-ed". The trailing edge of the OR-ed pulse is the same for all nodes and causes all synchronized BICs to be at the same point within the frame.

The method of waiting for the trailing edge of the OR-ed sync pulse causes the nodes to synchronize to the latest/slowest node. The BICs apply a time-out mechanism on the wait-for-trailing-edge, to preclude synchronizing to a node with a clock that is unacceptably slow. The X-BIC asserts a real-time clock strobe to its host processor upon detection of the trailing edge of the sync pulse.

Synchronization at message level takes place both for reception and for transmission. All BICs synchronize to each incoming message by detecting a start bit that is transmitted as the pre-amble to each data message. The clocking scheme specified above uses this start bit detection to determine when to sample and clock-in the rest of the bits of the incoming message.

At the very beginning of a time-slot in which a node is to transmit, that node's BICs asserts a Request-To-Transmit (RTT) to each other. In the architecture of FIG. 3, as soon as both BICs 108,110 have asserted their RTT, they are tightly synchronized for transmission. Next, the BICs enable each others bus line drivers, and output the actual message bit stream onto the bus.

A BIC that is "out-of-sync" enters the frame synchronization process, and searches for a sync pulse to either regain synchronization, or establish initial synchronization. A BIC that is "out-of-sync" does not transmit data onto the bus, nor receive data from the bus. If the BIC is "out-of-sync" it does not know the number or boundaries of the time-slots on the bus, and therefore cannot determine when to transmit data, or where to fetch or post received data from/to the host's memory.

In the embodiment of FIG. 3, only the X-BIC fetches data from the application's source-address; it loads the fetched data, together with the associated destination-address and a validity flag, into the buffer of both BICs 108, 110. If the BIC determines that a source-address is out-of-bounds, then the BIC transmits an idle message instead. The contents of the idle messages are arbitrary but its validity bit is set to invalid so that other nodes discard the message.

At the beginning of the transmission time-slot, the BIC outputs a start-bit and serialize the contents of the transmit buffer onto its bus-lines. The BIC performs the above transmission sequence in parallel with processing the data streams received during the preceding time-slot.

The backplane bus 106 comprises four data lines that are labeled Ax, Bx, Ay, By. The subscripts x and y identify the source BIC in the node that sends the data. Each BIC 106, 108 drives two data lines (either Ax & Bx or Ay & By), and receives data from all four. Under no-fault conditions, both BICs in a node receive complete and bit-identical messages on all lines simultaneously.

Each BIC checks and compares these redundant data streams, to detect and mask various error patterns. The result of this redundancy management process is either the selection of correct data, or indication that the data is corrupted in an incorrigible manner. The following message comparisons are performed:

Ax vs. Ay
Ax vs. By
Bx vs. Ay
Bx vs. By.

With four items (Ax, Ay, Bx, By) it is possible to form six distinct pairs. However, pair AxBx is generated by a single BIC, as is pair AyBy. These pairs could contain correlated errors, and are excluded from participating in the voting process.

A BIC Fault is declared, if the results from the pair-wise comparisons are inconsistent. The four pair-wise comparisons involve only four items; if three of the pairs match, then the fourth pair must also match. If not (for example, 1 of 4 pairs mismatches), then an error has occurred in the BIC logic. This inconsistency cannot be isolated, since it cannot be determined if it is caused by the mismatch being incorrect, or one or more of the matches being incorrect. Hence, all messages are declared invalid.

The results from the above fault detection processes are interpreted by a fault isolation process. The latter process determines the validity of each of the four redundant messages, and derives a single flag that indicates whether valid messages were received. This flag is exchanged between the paired BICs. A cross-BIC inconsistency is declared if the local BIC's flag is not equal to the flag received from the opposite BIC.

Message selection is the process that reduces the set of redundant valid messages to a single message. The fault detection process guarantees that all valid messages are identical. Therefore, any arbitrary one of the valid messages can be selected. If there are no valid messages (for example, an incorrigible error has been detected), then no message is selected. If there is a selected message, then it shall be transferred to the memory of the BIC's host processor unless the validity status bit contained in this message is set to "invalid".

Each BIC 106, 108 further includes a command register to which the node's host processing entity has "write" access. The host processor may write to this register in order to connect and disconnect the BIC from the bus.

Figure 4:
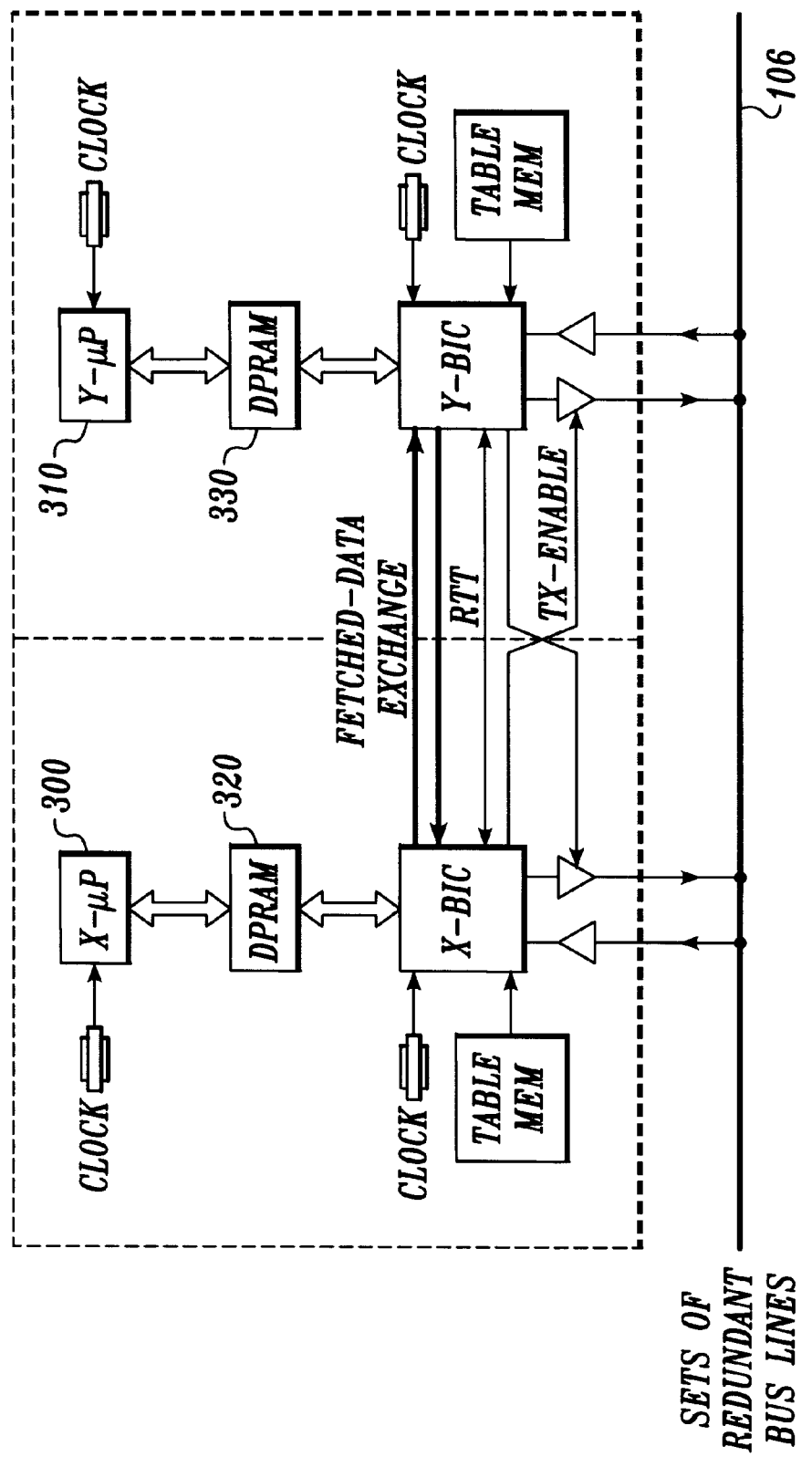
FIG. 4 is a block diagram of an alternate embodiment of the device of FIG. 3, wherein a dual source is used.

FIG. 4 illustrates an alternate architecture useful for implementing the present invention. In, FIG. 4 a dual source operation is illustrated wherein two microprocessors 300 and 310 are used instead of the single source host processor assumed in the previous discussion. Each processor is driven by an independent clock to prevent a single point of failure as described above. Associated with each microprocessor 300 and 310 is a dual ported RAM (DPRAM) 320, 330. Data received by the BICs for a particular channel may be stored in one or the other DPRAM according to the channel set up instructions from the corresponding processor.

In the dual source scenario, each microprocessor executes the same instructions and generates identical data in the no fault condition. Bus data is independently sourced by each microprocessor. Specifically, the X BIC of FIG. 4 retrieves data via microprocessor 300 and the Y BIC via microprocessor 310. The fetched data is then exchanged with the opposite BIC of the pair and a comparison is performed between the data retrieved from via that BICs associated microprocessor and the data received via the exchange. Data is only placed on the bus 106 if the data cross check is verified in both BICs. There is no data placed on bus 106 of either the X-BIC or the Y-BIC determine the data is mismatched.

In general, in the dual source mode, the two microprocessors will not complete their work and command the transmit operation to their respective BICs at the same time. When a coordinated transfer, or dual source operation, takes place, the first BIC to receive a command must wait for the second BIC to receive its command. To ensure that each X-Y source uses the same input data and performs the same operation and to guarantee that the X-Y source each simultaneously set up and initiate transmission, frame synchronization is used. In the dual source synchronization scheme, a frame comprises one major frame of 1 second with 200 identical minor frames of 5 msec. The synchronization occurs via a sync pulse which is now located at the major frame boundaries. The BICs assert major and minor frame real time clock strobes to the microprocessor to obtain:

automatic global alignment of major and minor frames;
enablement of application input data to be stable in both the X and Y microprocessor before starting the next iteration of that application;
scheduling of timely transfer of dual source application; and
control of end to end latency.

Figure 5:
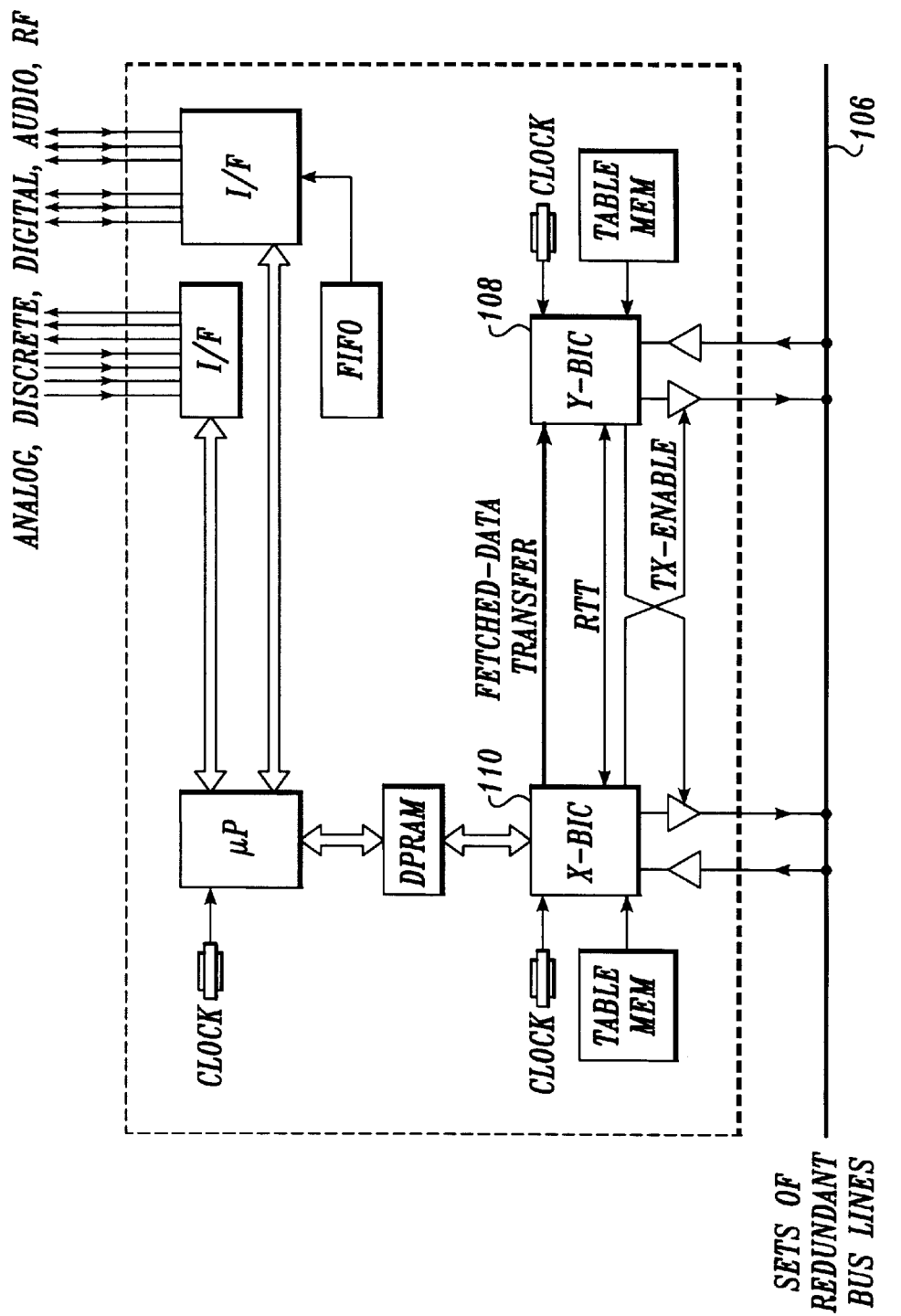
FIG. 5 is a block diagram of a single source data bus architecture according to an embodiment of the present invention.
Figure 6:
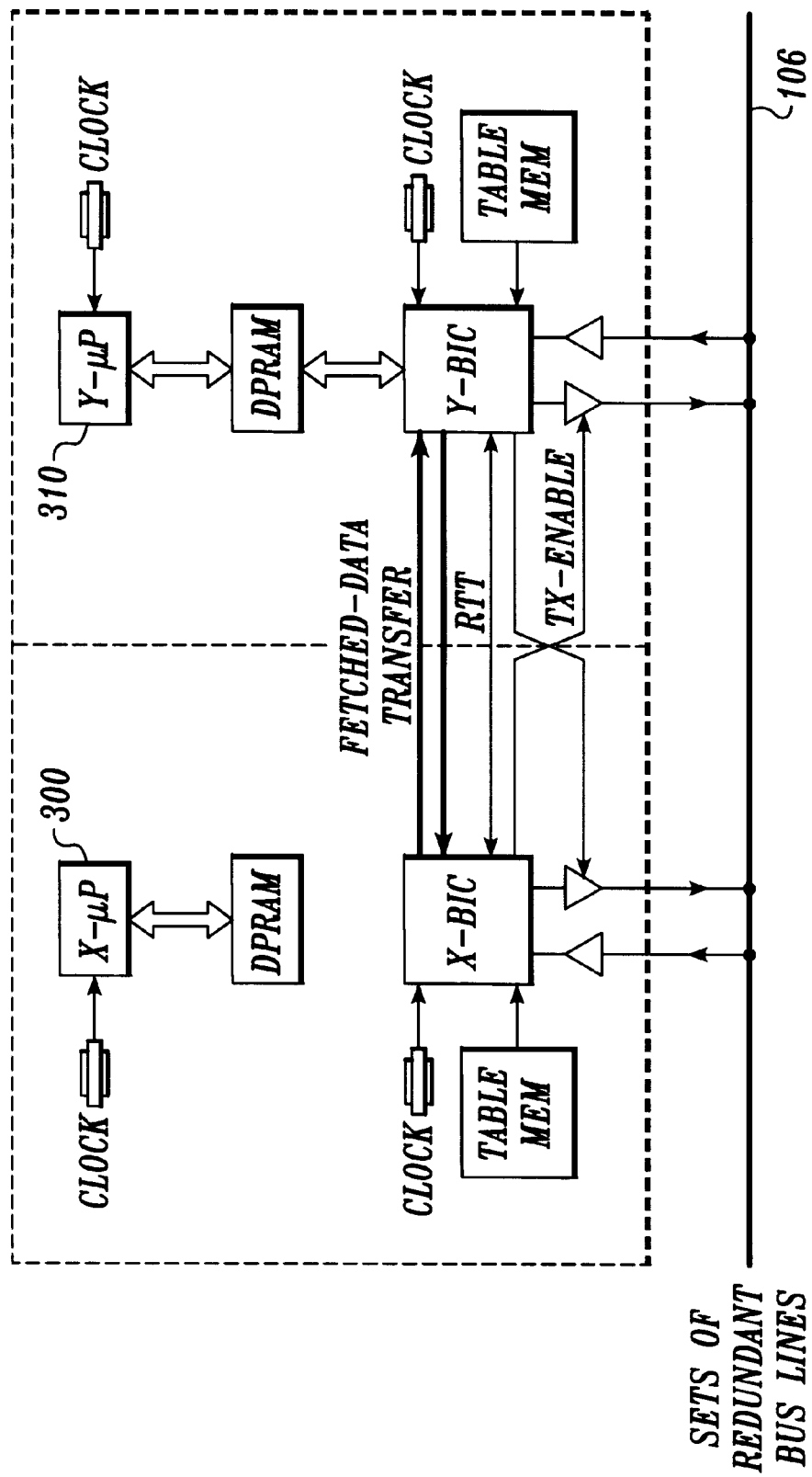
FIG. 6 is an alternate embodiment of a single source data bus architecture useful for implementing the present invention.
Figure 7:
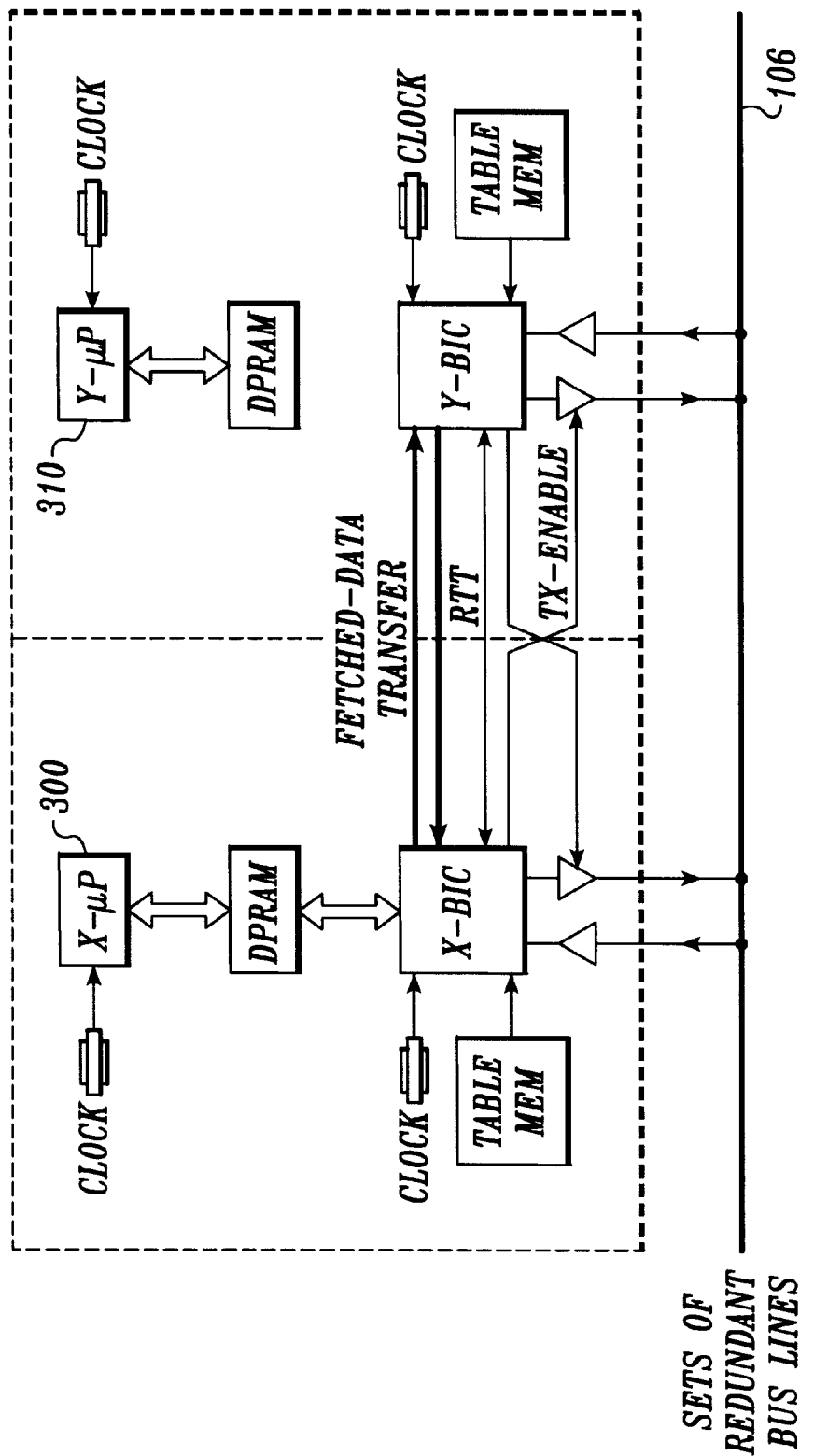
FIG. 7 is an alternate embodiment of a single source data bus architecture according to an embodiment of the present invention.

The architecture of FIG. 4 may also still be used as a single source device. FIG. 5 shows an alternate view of a single source device. Either the X or Y processor may serve as the single source as is illustrated in FIGS. 6 and 7. The single source vs. dual source is selectable on a channel basis (table driven) and thereby permits the degree of fault tolerance to be application or data specific. For example, the data occupying one channel may be less safety critical and processing of data for that channel may optionally be selected to use the single source option of FIGS. 6 or 7. This architecture also permits processors 300 and 310 to independently and concurrently run different applications during those microprocessor time slots that are not selected for dual sourced operations. Microprocessor resources can then be utilized efficiently for applications that do not require fault containment at the node level. System processing and operating times are thereby also improved.

In the single source operations of FIGS. 6 or 7, bus data is sourced by either the X or Y microprocessor. The associated BIC loads the fetched data into the opposite BIC of the pair. Each BIC then independently calculates the EDC. Data is then placed on the bus if both BICs agree that the checksum, EDC, calculation is valid.

From the discussion of FIGS. 3–7, those of skill in the art shall recognize that various combinations of numbers of processors can be used within each fault containment node. These nodes can be further configured for multiple or single source processor operation to optimize speed and volume of computations versus the degree of desired fault tolerance and safety criticality. Optionally, the numbers of BICs can be varied beyond the two BICs shown in the Figures. With additional BICs, the BICs do not need to physically cross enable each other due to the extra level of redundancy.

The preferred embodiments of the invention have now been described. Variations and modifications will be readily apparent to those of skill of the art. for this reason, the invention is to be interpreted in light of the claims.

TABLE 1

ALERT TIMES

| | GPWS: | | | | |
|---|---|---|---|---|---|
| Altitude | Mode 1 Caution | Mode 1 Warn | Mode 2 Warn | Mode 3 | Mode 4/5 |
| 2450 | 29 | 21 | N/A | N/A | N/A |
| 1500 | 26 | 19 | 17 | N/A | N/A |
| 900 | 22 | 17 | 17 | 110 | 54 |
| 500 | 15 | 13 | 11 | 60 | 30 |

Assumption:
1. Mode 3 alert times are based on 500 FPM descent rate.
2. Mode 4 alert times are based on 1000 FPM terrain closure rate.
3. Mode 5 alert times are based on 1000 FPM descend rate.
4. No separate caution alert time is calculated for Mode 2, since it is only one-second ahead of the warning.
5. Mode 2 warning times can be significantly shorter depending on the terrain characteristics.
6. G/S deviation; 1 dot is equal to 0.35 degrees.
EGPWS Alert Times:

Warning: 20–30 seconds
Caution: 40–60 seconds
ReWS Alert Time:

Warning: −5 seconds. It might be possible to enhance this figure with data from the PrWS.
Caution: Not being considered, since it is not commonly used today.

PrWS Alert Times:

| | Ground Speed | | | |
|---|---|---|---|---|
| PrWS Alert | 120 knots | 160 knots | 200 knots | Typical |
| Advisory | 150 sec | 112 sec | 90 sec | 60–90 sec |
| Caution | 90 sec | 67 sec | 54 sec | 30–70 sec |
| Warning | 45 sec | 34 sec | 27 sec | 10–35 sec |

TCAS:

TABLE 1-continued

ALERT TIMES

RA: 15 seconds
TA: 20–25 seconds

TABLE 2

COMPARISON OF ALERT TIMES

1500–2500 AGL

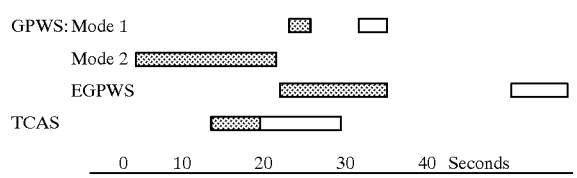

GPWS: Mode 1
Mode 2
EGPWS
TCAS 0  10  20  30  40 Seconds

1000–1500 AGL

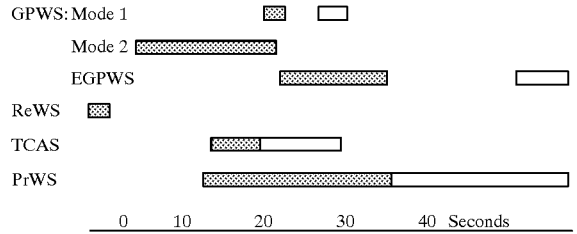

GPWS: Mode 1
Mode 2
EGPWS
ReWS
TCAS
PrWS 0  10  20  30  40 Seconds

500–1000 ft AGL

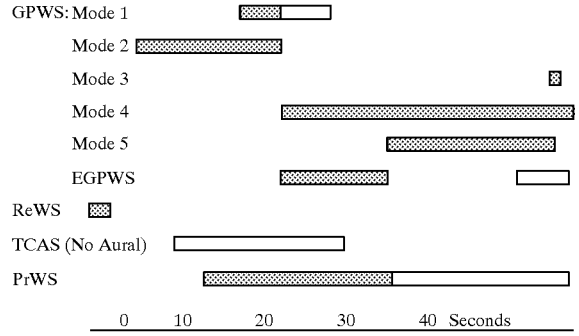

GPWS: Mode 1
Mode 2
Mode 3
Mode 4
Mode 5
EGPWS
ReWS
TCAS (No Aural)
PrWS 0  10  20  30  40 Seconds 50–500 ft AGL

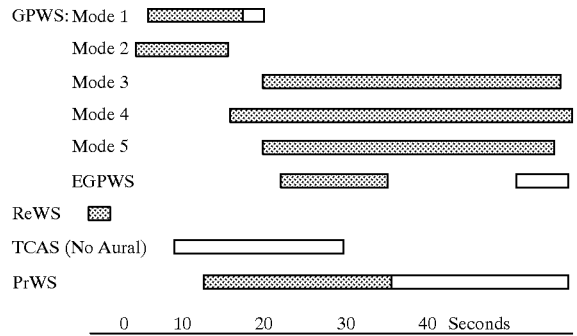

GPWS: Mode 1
Mode 2
Mode 3
Mode 4
Mode 5
EGPWS
ReWS
TCAS (No Aural)
PrWS 0  10  20  30  40 Seconds

TABLE 2-continued

COMPARISON OF ALERT TIMES

Key:
Warning: ▨
Caution: ▭
For TCAS; Warning = RA and Caution = TA.

TABLE 3

ALERT PRIORITIES

Above 2450 ft:

Only active system is TCAS. No priority assignment is required other than internal TCAS priorities.

1500–2450 ft AGL:

TCAS and GPWS Modes 1 and 2 as well as EGPWS;

| TCAS | Mode 1 Caution | Mode 1 Warn | Mode 2 Caution/ Warn | EGPWS Caution | EGPWS Warn |
|---|---|---|---|---|---|
| Climb: Corrective | Suppress Mode 1 | RA has priority | Suppress RA | RA has priority | RA has priority |
| Climb: Preventive | N/A | N/A | Suppress RA | RA has Priority | RA has priority |
| Descent: Corrective | RA has priority | Suppress RA | Suppress RA | RA has Priority | Suppress RA |
| Descent: Preventive | RA has priority | Suppress RA | Suppress RA | RA has Priority | Suppress RA |
| Crossover Climb: Corrective | Suppress Mode | RA has priority | Suppress RA | RA has priority | RA has priority |
| Crossover Climb: Preventive | N/A | N/A | Suppress RA | RA has Priority | RA has Priority |
| Vertical Speed Restricted: Corrective (Climbing) | N/A | N/A | Suppress RA | RA has Priority | RA has Priority |
| Vertical Speed Restricted: Preventive (Climbing) | N/A | N/A | Suppress RA | RA has Priority | RA has Priority |
| Vertical Speed Restricted: Corrective (Descending) | Suppress Mode 1 | Suppress RA | Suppress RA | RA has Priority | Suppress RA |
| Vertical Speed Restricted: Preventive (Descending) | Suppress Mode 1 | Suppress RA | Suppress RA | RA has Priority | Suppress RA |
| Change from Climb to Descent | RA has priority | Suppress RA | Suppress RA | RA has Priority | Suppress RA |
| Change from Descent to Climb | Suppress Mode | RA has priority | Suppress RA | RA has priority | RA has priority |

6,002,347

TABLE 3-continued
ALERT PRIORITIES

| | | | | | |
|---|---|---|---|---|---|
| Increase Climb Rate | Suppress Mode 1 | N/A | Suppress RA | RA has Priority | RA has priority |
| Increase Descent Rate | RA has priority | Suppress RA | Suppress RA | RA has Priority | Suppress RA |

1000–1500 ft AGL:

TCAS, GPWS (Modes 1 and 2 as well as EGPWS), ReWS, and PrWS (Advisory, Caution, and Warning) are enabled. Priorities between TCAS and GPWS Mode 1 and 2 are the same as before.

TCAS/Windshear:

Note: TACAS "increase descent" alert is inhibited below 1450 ft.

| TCAS | ReWS | PrWS-Advisory | PrWS-Caution | PrWS-Warning |
|---|---|---|---|---|
| Climb: Corrective | Suppress RA | RA has priority | RA has priority | Suppress RA |
| Climb: Preventive | Suppress RA | RA has priority | RA has priority | Suppress RA |
| Descent: Corrective | Suppress RA | RA has priority | RA has priority | Suppress RA |
| Descent: Preventive | Suppress RA | RA has priority | RA has priority | Suppress RA |
| Crossover Climb: Corrective | Suppress RA | RA has priority | RA has priority | Suppress RA |
| Crossover Climb: Preventive | Suppress RA | RA has priority | RA has priority | Suppress RA |
| Vertical Speed Restricted: Corrective (Climbing) | Suppress RA | RA has priority | RA has priority | Suppress RA |
| Vertical Speed Restricted: Preventive (Climbing) | Suppress RA | RA has priority | RA has priority | Suppress RA |
| Vertical Speed Restricted: Corrective (Descending) | Suppress RA | RA has priority | RA has priority | Suppress RA |
| Vertical Speed Restricted: Preventive (Descending) | Suppress RA | RA has priority | RA has priority | Suppress RA |
| Change from Climb to Descent | Suppress RA | RA has priority | RA has priority | Suppress RA |
| Change from Descent to Climb | Suppress RA | RA has priority | RA has priority | Suppress RA |
| Increase Climb Rate | Suppress RA | RA has priority | RA has priority | Suppress RA |
| Increase Sescent Rate | Suppress RA | RA has priority | RA has priority | Suppress RA |

TABLE 3-continued
ALERT PRIORITIES

Windshear/GPWS:

| | Mode 1 Caution | Mode 1 Warn | Mode 2 Caution/Warn | EGPWS Caution | EGPWS Warn |
|---|---|---|---|---|---|
| ReWS | Suppress Mode 1 | Suppress Mode 1 | Suppress Mode 2 | Suppress EGPWS | Suppress EGPWS |
| PrWS-Advisory | Both allowed | Both allowed | Suppress PrWS | Both allowed | Both allowed |
| PrWS-Caution | Mode 1 has priority | Suppress PrWS | Suppress PrWS | PrWS has priority | Suppress PrWS |
| PrWS-Warning | Suppress Mode 1 | PrWS has priority | Mode 2 has priority | PrWS has priority | PrWS has priority |

500–1000 ft AGL:

No TCAS alerts.

| GPWS | ReWS | PrWS-Advisory | PrWS-Caution | PrWS-Warning |
|---|---|---|---|---|
| Mode 1: Caution | Suppress Mode 1 | Both allowed | Mode 1 has priority | Suppress Mode 1 |
| Mode 1: Warning | Suppress Mode 1 | Both allowed | Suppress PrWS | PrWS has priority |
| Mode 2: Warning | Suppress Mode 2 | Suppress PrWS | Suppress PrWS | Mode 2 has priority |
| Mode 3: Warning | Suppress Mode 3 | Both allowed | Mode 3 has priority | Suppress Mode 3 |
| Mode 5: Soft | Suppress Mode 5 | Both allowed | PrWS has priority | Suppress Mode 5 |
| Mode 5: Hard | Suppress Mode 5 | Both allowed | Mode 5 has priority | Suppress Mode 5 |
| EGPWS Caution | Suppress EGPWS | Both allowed | PrWS has priority | PrWS has priority |
| EGPWS Warning | Suppress EGPWS | Both allowed | EGPWS has priority | PrWS has priority |

50–500 ft AGL:

No TCAS aural alerts.

| GPWS | ReWS | PrWS-Advisory | PrWS-Caution | PrWS-Warning |
|---|---|---|---|---|
| Mode 1: Caution | Suppress Mode 1 | Both allowed | Mode 1 has priority | Suppress Mode 1 |
| Mode 1: Warning | Suppress Mode 1 | Suppress PrWS | Suppress PrWS | PrWS has priority |

TABLE 3-continued

ALERT PRIORITIES

| | | | | |
|---|---|---|---|---|
| Mode 2: Warning | Suppress Mode 2 | Suppress PrWS | Suppress PrWS | Mode 2 has priority |
| Mode 3: Warning | Suppress Mode 3 | Both allowed | Mode 3 has priority | PrWS has priority |
| Mode 4: Warning | Suppress Mode 4 | Both allowed | Mode 4 has priority | PrWS has priority |
| Mode 5: Soft | Suppress Mode 5 | Both allowed | PrWS has priority | Suppress Mode 5 |
| Mode 5: Hard | Suppress Mode 5 | Both allowed | Mode 5 has priority | PrWS has priority |
| EGPWS Caution | Suppress EGPWS | Both allowed | PrWS has priority | PrWS has priority |
| EGPWS Warning | Suppress EGPWS | Both allowed | EGPWS has priority | PrWS has priority |

We claim:

1. An aircraft flight hazard avoidance system comprising:
   a plurality of flight hazard warning systems wherein each of said systems generates an alert signal indicating a potential flight hazard;
   indicator means, responsive to said alert signals, for generating command indications corresponding to said alert signals for directing the operator of the aircraft to avoid said potential flight hazards; and
   an alerting system, responsive to at least two of said alert signals generated concurrently, for selecting one of said concurrently generated alert signals for input to said indicator means wherein said selected alert signal represents the most critical flight hazard.

2. The system of claim 1 wherein said plurality of flight hazard warning systems includes a ground proximity warning system and a traffic collision warning system.

3. The system of claim 2 wherein said plurality of flight hazard warning systems additionally includes a predictive windshear system.

4. The system of claim 3 wherein said plurality of flight hazard warning systems additionally includes an enhanced ground proximity warning system.

5. The system of claim 4 wherein said plurality of flight hazard warning systems additionally includes a reactive windshear system.

6. The system of claim 1 wherein said alerting system includes flight path means for determining the projected flight path as suggested by each of said alert signals, wherein said alerting system includes threat condition means, responsive to said flight path means, for suppressing a generated one of said alert signals when said projected flight path as suggested by said alert signal would increase the threat to the aircraft.

7. The system of claim 1 wherein said alerting system includes comparing means for comparing a first one of said alert signals to a second subsequently generated one of said alert signals to determine whether said second alert signal represents a greater hazard probability than a hazard probability represented by said first alert signal and selecting for input to said indicator means the alert signal having the greatest hazard probability.

8. The system of claim 7 wherein said comparing means includes complementary means for determining if the corresponding command indications for said first and said second alert signals are complementary and selecting for input to said indicator means said second alert signal if said alert signals are not complementary.

9. The system of claim 1 wherein said alerting system includes a memory storing a plurality of alert priorities and computer means for selecting from said alert priorities said alert signal representing the most critical flight hazard.

10. The system of claim 9, wherein said alert priorities are based on an estimation of alert time and an estimation of the probability the hazard will result in an accident for each of said alert signals.

11. The system of claim 9 wherein said computer means in response to said alert priorities suppresses said alert signals which can not contribute to a pilot's situation awareness and which can contribute to pilot confusion.

12. The system of claim 9 wherein said computer means in response to said alert priorities suppresses a subsequent one of said alert signals having the same expected pilot reaction as a previously generated one of said alert signals.

13. The system of claim 9 wherein said alert priorities additionally represent expected pilot reaction to said alert signals.

14. The system of claim 9 wherein said alert priorities are based on the altitude of the aircraft above ground.

15. The system of claim 14 wherein said flight hazard warning systems include a ground proximity warning system having modes 1–5, a traffic collision warning system and a windshear alert system.

16. The system of claim 15 wherein said computer means suppresses said alert signals from said windshear alert system and 3 of 5 modes of said ground proximity warning system above a first predetermined altitude.

17. The system of claim 16 wherein said computer means enables said alert signals from said windshear alert system while suppressing said alert signals from 3 of 5 modes of said ground proximity warning system below said first predetermined altitude above ground and above a second predetermined altitude above ground.

18. The system of claim 17 wherein said computer means enables said alert signals from 3 of 5 modes of said ground proximity warning system and suppresses selected ones of said alert signals from said traffic collision warning system below said second predetermined altitude and above a third predetermined altitude above ground.

19. The system of claim 1 including:
   an I/O module adapted to receive flight data from the aircraft;
   a central computer operatively connected to said I/O module and wherein at least two of said warning systems and said alerting system is implemented in said central computer; and
   wherein said indicator means includes a speaker for generating aural alerts and a cockpit display for generating visual displays of alerts in response to said alert signals.

20. The system of claim 19 wherein said flight warning systems include a traffic collision warning system and wherein one of said warning systems implemented in said central computer is a ground proximity warning system.

21. The system of claim 20 including inhibit means for transmitting an inhibit signal from said alert system to said traffic collision warning system when said alert signal generated by said traffic collision warning system does not represent the most critical flight hazard, wherein said traffic collision warning system is inhibited when the inhibit signal is received.

22. The system of claim 20 wherein said I/O module is adapted to receive data from a weather radar and wherein one of said warning systems implemented in said central computer is a windshear warning system.

23. The system of claim 22 wherein said windshear system is a predictive windshear system and one of said warning systems implemented in said central computer is a reactive windshear system.

24. The system of claim 20 wherein one of said warning systems implemented in said central computer system is an enhanced ground proximity warning system.

25. The system of claim 19 wherein said central computer includes a plurality of processor units.

26. A method for providing a alert of a hazardous flight condition for an aircraft comprising the steps of:
monitoring sensor data;
analyzing said sensor data for a plurality of potential flight hazards;
outputting an alert signal according to a predetermined alert schedule when at least one potential flight hazard is detected, and wherein said alert schedule includes a procedure for arbitrating between a multiple of alert conditions as a function of aircraft altitude; and
generating command indications based on the outputted alert signal.

27. A method for providing an alert of a hazardous flight condition for an aircraft comprising the steps of:
monitoring sensor data;
analyzing said sensor data for a plurality of potential flight hazards;
outputting an alert signal according to a predetermined alert schedule when at least one potential flight hazard is detected, and wherein said alert schedule includes a procedure for arbitrating between a multiple of alert conditions as a function of a particular combination of hazardous flight conditions represented within said multiple alert condition; and
generating command indications based on the outputted alert signal.

28. A method for providing an alert of a hazardous flight condition for an aircraft comprising the steps of:
monitoring sensor data;
analyzing said sensor data for a plurality of potential flight hazards;
outputting an alert signal according to a predetermined alert schedule when at least one potential flight hazard is detected, and wherein said alert schedule includes a procedure for arbitrating between a multiple of alert conditions as a function of a flight path of the aircraft; and
generating command indications based on the outputted alert signal.

29. A method for providing an alert of a hazardous flight condition for an aircraft comprising the steps of:
monitoring sensor data;
analyzing said sensor data for a plurality of potential flight hazards;
outputting an alert signal according to a predetermined alert schedule when at least one potential flight hazard is detected, and wherein said alert schedule includes a procedure for arbitrating between a multiple of alert conditions as a function of anticipated corrective responses to the hazardous flight conditions represented within said multiple alert condition; and
generating command indications based on the outputted alert signal.

30. A method for providing an alert of a hazardous flight condition for an aircraft comprising the steps of:
(a) detecting if a first hazardous flight condition exits;
(b) determining if a second hazardous flight condition exists;
(c) comparing said first hazardous condition and said second hazardous condition according to a predefined criterion, wherein said step of comparing further comprises determining if corrective actions to said first and said second hazardous flight conditions are complementary; and
(d) issuing an alert based on a result of step (c).

31. The method of claim 30 wherein said step of comparing further comprises the step of comparing a relative hazard of each of said first and second hazardous flight conditions.

32. The method of claim 30 wherein said step of comparing further comprises the step of comparing a flight path associated with each of said first and second hazardous conditions.

33. A method for providing an alert of a hazardous flight condition for aircraft comprising the steps of:
detecting a hazardous condition;
determining if a projected flight path associated with an alert of said hazardous condition increases a threat condition of the aircraft; and
suppressing an alert of said hazardous flight condition if the flight path associated with said hazardous flight condition increases said threat condition.

34. A device for providing an alert within an aircraft of a hazardous flight condition, said device comprising:
an input for receiving sensor data;
a plurality of hazard detecting functions, each of said functions coupled to receive a given set of said sensor data, for determining if a hazard condition exists;
an alert generation device, having an input coupled to each of said plurality of hazard detecting functions, for evaluating an input signal indicative of the hazardous condition, and for outputting an alert signal based upon a predetermined alert schedule; and
a command generating device for generating command indications based on the outputted alert signal.

35. The device of claim 34 further comprising a fault tolerant database for coupling said plurality of hazard detecting functions to said alert generating device.

* * * * *